Patented Jan. 15, 1929.

1,698,800

UNITED STATES PATENT OFFICE.

KARL LÜDECKE AND NELLY LÜDECKE, OF BERLIN-DAHLEM, GERMANY.

PROCESS FOR THE PRODUCTION OF GLYCERIN.

No Drawing. Application filed July 15, 1926, Serial No. 122,741, and in Germany June 21, 1926.

The production of glycerin by fermentation from sugar in an alkaline medium by the use of salts, for instance of sulphites, has already been proposed (U. S. Patent 1,511,754, Berichte der Deutschen Chemischen Gesellschaft 52, page 1385). The relatively large quantities of salts however, which must be added for producing appreciable quantities of glycerin, increase the cost of the known processes to such an extent that under the present changed economic conditions they can no longer be carried out profitably.

German Patent 347,604 suggests a better utilization of the quantities of salt required for the glycerin fermentation and of the yeast, by sugar being again added to the fermenting mass. While the yeast ferments the sugar under the conditions laid down in the patent referred to, the yield of glycerin decreases almost proportionally to the quantity of added sugar.

The inventors have found that with one and the same quantity of salt (for instance a sulphite) and with a yield of almost the same percentage of glycerin (with respect to the sugar) sugar or solutions of raw sugar or beet juice may be repeatedly fermented, if after the fermentation has come to an end the volatile fermentation products of the fermented mash are first distilled off and sugar is again disolved and fermented in the remaining glycerin-containing mash.

The chief volatile fermentation products for this purpose are those which are volatile below 100° C. Preferably the distillation of these fermentation products will only be carried out when the fermentation is practically finished, but the distillation can of course in certain circumstances be carried out at an earlier stage. In most cases the yeast will first be filtered off before the volatile fermentation products are distilled off, but this is not necessary. The process according to the present invention may be repeated as often as desired, one and the same salt solution being used. It is also possible when carrying out the present process to use the methods already employed for the production of glycerin from sugar by fermentation in an alkaline medium, for instance, the work may be carried out in the presence of catalysts. In this way the fermentation may be carried out repeatedly with one and the same quantity of salt without any further additions except sugar. It is obvious that by this means the process will be made very considerably cheaper.

It is very surprising that the glycerin-forming salts should be regenerated by simply heating the mash and that also a very high concentration of glycerin, for instance 12% and upwards does not hinder the formation of fresh glycerin in the fermented mash.

The object of the use for instance of sulphite in the glycerin fermentation is to bind the acetaldehyde, this being effected by sodium bicarbonate and bisulphite being formed during the fermentation by the evolution of carbonic acid. The quantity of glycerin formed is approximately proportional to the quantity of aldehyde formed and bound. This explains the fact that, as already explained, by adding sugar to the mash during the fermentation process there will be no increase in the formation of glycerin proportional to the quantity of added sugar, as the formation and binding of the aldehyde depends on the concentration of the sulphite and the hydrolysis of the sulphite. During the fermentation the hydrolysis of the sulphite will reach its highest point and consequently there will be a maximum binding of aldehyde and the corresponding formation of glycerin, which is not materially altered by the addition of fresh quantities of sugar. Hence, if only fresh quantities of sugar are added, but the volatile fermentation products are not removed, there will be no appreciable additional formation of glycerin during or after the fermentation. By the process according to the present invention it is found that the salt which is in solution is regenerated in consequence of being heated, is capable of binding fresh aldehyde and thus forms the basis for the production of fresh glycerin.

That by simply heating the fermented mash up to about 100°, without the addition of soda or the like, the aldehyde distils off almost quantitatively, was to be expected all the less, since the analogous form-aldehyde, even when large quantities of soda are present, can hardly be driven out of its bisulphite compound by boiling in a watery solution, or only to a very small extent (cf. Centralblatt 1926, page 3137).

Since in distilling off the volatile fermentation products in certain circumstances an oxidation of the sulphite may take place, even if only to an inconsiderable extent, about 10% of fresh sulphite may be added for the new fermentation and a small quantity of water for keeping the concentration of the salts as uniform as possible. These additions are however not necessary, only they slightly increase the yield of glycerin. It is also not necessary to use fresh nutritive salts for the yeast or to take some fresh catalyst, such catalysts being preferably compounds of nickel or cobalt, (for instance sulphates). This can of course be done without detrimentally affecting the fermentation.

The yeast may be filtered off before evaporating the volatile fermentation products and may be used repeatedly or the filtered off yeast may be mixed with a small quantity of fresh yeast when being used again. Fresh yeast may however be used every time. Any regeneration fermentation of the filtered off yeast is not necessary, but it is also not detrimental.

The isolation of the glycerin from the fermented mash is effected by the usual methods. Thus, for instance the fermented mash, preferably after allowing the yeast to settle and after filtering it off, may be evaporated, for obtaining the formed alcohol and aldehyde, whereupon the glycerin is extracted with alcohol from the residual salt sludge or is distilled off in a vacuum with superheated steam. Another method is, instead of extracting with alcohol, to separate the glycerin from the salts by centrifuging or pressing in filter presses and then to distil it, or before evaporating the sulphite is precipitated with calcium chloride, after which the mash containing the common salt and glycerin is boiled down and the glycerin is obtained as in the treatment of the spent lye in the manufacture of soap.

*Example 1.*

100 g. of sugar are dissolved with 150 g. crystallized sodium sulphite and 1 g. of sodium phosphate in 1750 cc. of water. After dissolving a solution of 0.5 g. ammonium sulphate, 1 g. magnesium sulphate, 1 g. nickel sulphate, and 10 g. of yeast in 250 cc. of water is added and the mixture allowed to stand at about 30 to 35° C. After about two days the sugar will have disappeared. The yeast is then filtered off and the fermented mash is boiled, until the aldehyde and the alcohol is distilled off. Thereupon 100 g. of sugar and 15 g. of sodium sulphite are again dissolved in the boiled mash and made up to 2 litres, the filtered off yeast and an additional 5 g. of fresh yeast are added and the whole is allowed to ferment again at 30 to 35°. After two days the sugar will have disappeared again. The alcohol and aldehyde are then distilled off and the process started again as described above. This process can be repeated over and over again. For instance, after 500 g. of sugar have been fermented, the yeast is filtered off, the mixture is boiled down and the glycerin isolated from the residue, for instance by extraction with alcohol. After the alcohol has been evaporated 169 g. of 81.1% raw glycerin will be left, corresponding to 137 g. of pure glycerin.

*Example 2.*

1 kg. of sugar is dissolved with 10 g. of sodium phosphate and 750 g. crystallized sodium sulphite in 7.5 litres of water, after which a solution of 5 g. ammonium sulphate, 10 g. magnesium sulphate, 10 g. nickel sulphate and 100 g. of yeast in 2.5 litres of water are added. This mash is allowed to ferment at 30 to 35° C. After about two days the sugar will have fermented. The yeast is then filtered off, the alcohol and aldehyde boiled away and 1 kg. of sugar and 100 g. of sulphite, the filtered off yeast and 50 g. of fresh yeast are added, the whole being made up to 11 litres after standing for two days at 30 to 35° C. the sugar will have disappeared. This operation is repeated, 1 litre of water being added each time. If for instance 4 kg. of sugar have been fermented in this manner and the glycerin isolated as described above, 1.2 kg. of raw glycerin will be obtained, corresponding to 960 g. of pure glycerin.

*Example 3.*

2 kgs. of molasses are dissolved together with 10 grams of sodium phosphate and 750 grams of crystallized sodium sulphite in 8.5 litres of water and to this is added a solution of 10 grams magnesium sulphate, 10 grams of nickel sulphate and 100 grams of yeast in 2.5 litres of water. This mash is allowed to ferment at 30–35° C. After about two days the sugar is fermented, the yeast is filtered off and the alcohol and aldehyde boiled off. A further 2 kgs. of molasses and 100 grams sulphite, 5 grams of magnesium sluphite, the filtered off yeast and 50 grams fresh yeast are added and made up to 11 litres. After two days' standing at 30 to 35° C. the sugar has disappeared. This operation is now repeated and a further litre of water added. If 8 kgs. are fermented in this manner and the glycerin isolated as above described, about 2 kgs. of raw glycerin corresponding to 960 kgs. of pure glycerin are obtained.

Of course, any sugar-containing alkaline solutions may be used for carrying out the present invention, such as for instance sugar syrups or molasses.

What we claim is:

1. Process for the production of glycerin consisting in fermenting sugar with yeast in an alkaline solution, then after fermentation distilling off the fermentation products which boil below 100° C. from the fermented mash and then adding further quantities of yeast and sugar to the remaining mash and re-fermenting the same.

2. Process for the production of glycerin consisting in fermenting sugar with yeast in an alkaline solution then after partial fermentation distilling off the fermentation products which boil below 100° C. from the fermented mash and then adding further quantities of yeast and sugar to the remaining mash and re-fermenting the same.

3. Process for the production of glycerin consisting in fermenting sugar with yeast in an alkaline solution and after fermentation separating the yeast from the mash, then distilling off the fermentation products boiling below 100° C. from the fermented mash and adding a fresh quantity of sugar and the recovered yeast to the remaining mash and re-fermenting the same.

4. Process for the production of glycerin consisting in fermenting sugar with yeast in an alkaline solution and after partial fermentation, separating the yeast from the mash, then distilling off the fermentation products boiling below 100° C. from the fermented mash and adding a fresh quantity of sugar and the recovered yeast to the remaining mash and re-fermenting the same.

5. Process for the production of glycerin consisting in fermenting sugar with yeast in an alkaline solution, then after fermentation distilling off the fermentation products which boil below 100° C. from the fermented mash and adding further quantities of sugar and yeast to the remaining mash and re-fermenting and repeating the process until the content of glycerin in the fermented mash has reached the desired concentration.

6. Process for the production of glycerin, consisting in fermenting sugar with yeast in an alkaline solution, then after partial fermentation distilling off the fermentation products which boil below 100° C. from the fermented mash and adding further quantities of sugar and yeast to the remaining mash and re-fermenting and repeating the process until the content of glycerin in the fermented mash has reached the desired concentration.

7. A process for the production of glycerin consisting in fermenting sugar with yeast in an alkaline solution and after fermentation separating the yeast from the mash, then distilling off the fermentation products boiling below 100° C. from the fermented mash and adding a fresh quantity of sugar and the recovered yeast to the remaining mash and re-fermenting the same, repeating this process until the glycerin content of the fermented mash has reached the desired concentration.

8. Process for the production of glycerin consisting in fermenting sugar with yeast in an alkaline solution and after partial fermentation separating the yeast from the mash then distilling off the fermentation products boiling below 100° C. from the fermented mash and adding a fresh quantity of sugar and the recovered yeast to the remaining mash and re-fermenting the same, repeating this process until the glycerin content of the fermented mash has reached the desired concentration.

9. Process for the production of glycerin consisting in fermenting sugar with yeast in an alkaline solution, distilling off the volatile fermentation products, then re-fermenting the mash freed from the volatile fermentation products by distillation with the addition of further quantities of sugar, yeast, and a small quantity of sodium sulphite.

10. Process for the production of glycerin consisting in fermenting sugar with yeast in an alkaline solution, distilling off the volatile fermentation products, then re-fermenting the mash freed from the volatile fermentation products by distillation with the addition of further quantities of sugar, recovered yeast and a small quantity of sodium sulphite.

In testimony whereof we have signed our names to this specification.

Dr. KARL LÜDECKE.
NELLY LÜDECKE.